United States Patent
Sadeghi et al.

(10) Patent No.: US 9,531,446 B2
(45) Date of Patent: Dec. 27, 2016

(54) USE OF LOCATION INFORMATION IN MULTI-RADIO DEVICES FOR MMWAVE BEAMFORMING

(75) Inventors: Bahareh Sadeghi, Portland, OR (US);
Carlos Cordeiro, Portland, OR (US);
Guoqing Li, Portland, OR (US);
Vallabhajosyula S. Somayazulu, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 415 days.

(21) Appl. No.: 13/993,218

(22) PCT Filed: Dec. 15, 2011

(86) PCT No.: PCT/US2011/065110
§ 371 (c)(1),
(2), (4) Date: Apr. 17, 2014

(87) PCT Pub. No.: WO2013/089731
PCT Pub. Date: Jun. 20, 2013

(65) Prior Publication Data
US 2014/0218236 A1    Aug. 7, 2014

(51) Int. Cl.
*H04B 7/10* (2006.01)
*H04B 7/00* (2006.01)
(Continued)

(52) U.S. Cl.
CPC .............. *H04B 7/00* (2013.01); *G01S 5/0072* (2013.01); *H04W 16/28* (2013.01); *H04W 64/00* (2013.01); *H04W 88/06* (2013.01)

(58) Field of Classification Search
CPC ............ H04B 7/10; H04B 7/00; H04W 16/28; H04W 64/00; H04W 88/06; G01S 5/0072
(Continued)

(56) References Cited

U.S. PATENT DOCUMENTS

2005/0048921 A1    3/2005 Chung et al.
2006/0111149 A1    5/2006 Chitrapu et al.
(Continued)

FOREIGN PATENT DOCUMENTS

WO    2013/089731 A1    6/2013
WO    2013/089733 A1    6/2013

OTHER PUBLICATIONS

Taori, Rakesh, "Hierarchical Network Study Report", IEEE 802.16 Broadband Wireless Access Working Group, Nov. 9, 2011, 34 pages.
(Continued)

*Primary Examiner* — Harry Liu
(74) *Attorney, Agent, or Firm* — Ellis B. Ramirez; PRASS LLP

(57) ABSTRACT

A system and method are provided for using location services available from other radios in a multi-radio system to assist a beamforming mechanism, particularly in establishing and maintaining mmWave communication link. A majority of wireless client devices for use in a mmWave communication link are equipped with multiple radios. Many of the "other" radios include technologies that support location based services, including GPS, Wi-Fi and cellular communications. One or more non-mmWave in one device is used to provide relative location information regarding the other device with which the mmWave communication link is to be established. The relative location information is used to derive a direction for communication, and to compute beamforming parameters, in a limited set of transmit/receive sectors where the destination device is likely to be found, in order to streamline the beamforming process.

16 Claims, 3 Drawing Sheets

(51) Int. Cl.
*H04W 16/28* (2009.01)
*G01S 5/00* (2006.01)
*H04W 64/00* (2009.01)
*H04W 88/06* (2009.01)

(58) Field of Classification Search
USPC .......................................................... 342/367
See application file for complete search history.

(56) References Cited

U.S. PATENT DOCUMENTS

| | | |
|---|---|---|
| 2007/0249402 A1 | 10/2007 | Dong et al. |
| 2008/0194204 A1 | 8/2008 | Duet et al. |
| 2008/0311944 A1* | 12/2008 | Hansen .................... G01S 1/02 455/517 |
| 2009/0233549 A1* | 9/2009 | Maltsev ................... H01Q 3/26 455/41.2 |
| 2010/0027494 A1 | 2/2010 | Kwon et al. |
| 2010/0130138 A1 | 5/2010 | Nandagopalan et al. |
| 2010/0164805 A1* | 7/2010 | Niu ........................ H01Q 1/125 342/377 |
| 2010/0203911 A1* | 8/2010 | Cordeiro ........... H04W 72/0453 455/501 |
| 2010/0215027 A1* | 8/2010 | Liu ...................... H04B 7/0695 370/338 |

OTHER PUBLICATIONS

Lee, Hyukjoon, "Transmission Modes for Multi-Radio Access in Hierarchical Networks", IEEE 802.16 Broadband Wireless Access Working Group, IEEE C802. 16ppc-II_0015, Nov. 5, 2011, 7 pages.
International Preliminary Report on Patentability and Written Opinion received for PCT Patent Application No. PCT/US2011/065110, mailed on Jun. 26, 2014, 5 pages.
International Search Report and Written Opinion Received for PCT Patent Application No. PCT/US2011/065110, mailed on Aug. 31, 2012, 8 pages.
International Preliminary Report on Patentability and Written Opinion received for PCT Patent Application No. PCT/US2011/065117, mailed on Jun. 26, 2014, 6 pages.
International Search Report and Written Opinion received for PCT Patent Application No. PCT/US2011/065117, mailed on Jul. 25, 2012, 9 pages.

* cited by examiner

USE OF LOCATION INFORMATION IN MULTI-RADIO DEVICES FOR MMWAVE BEAMFORMING

BACKGROUND

1. Field of the Disclosed Embodiments

This disclosure relates to systems and methods for using location information derived from other radios in a multi-radio device to streamline a millimeter wave (mmWave) beamforming process.

2. Related Art

With the proliferation of wireless devices of all types running increasingly sophisticated applications, the demand for available bandwidth has increased dramatically. Communications in the millimeter wave (mmWave), e.g. 60 GHz region of the frequency spectrum have emerged as a unique solution to the need for increased bandwidth for a number of reasons. Transmitting, for example, in the 60 GHz frequency range offers extremely high data throughputs as a result of the ultra-wide bandwidth available. A tradeoff is that communications in this frequency range are highly directional with directional antenna beam forming arrays being required to sustain reasonable transmission distances based on the atmospheric absorption of the transmitted RF energy.

Wireless communications in the 60 GHz frequency range experience a high level of atmospheric radio frequency (RF) energy absorption. Understanding that the transmitted RF energy in this frequency region would be quickly absorbed by oxygen molecules in the atmosphere over long distances, wireless technology developers focused on this characteristic as a benefit for certain applications. Previously, the high levels of atmospheric absorption and resultant range limitations were viewed as rendering mmWave technologies unsuitable for certain wireless applications. As there emerged a need for short-range high data throughput transmission paths, however, mmWave technologies, and particularly 60 GHz mmWave systems, emerged as a solution.

Transmitting in the mmWave region of the RF spectrum results in a fairly focused beam as compared to transmitting in lower frequency ranges. An ability to provide secure, straight-line, high data rate communications is a significant plus. This is balanced by the need to establish and maintain directional beam communication with a receiving device, such as a mobile client device with which a mmWave source is communicating. The beamforming effort itself requires significant time and a certain amount of computing overhead to complete.

Simply put, the higher attenuation for mmWave transmissions, particularly in the 60 GHz frequency range, results in shorter transmission ranges. Directional communication with use of highly directional antennas is used to concentrate the energy in a narrow transmission beam in one specific direction. This directing of the RF energy results in a reasonable increase in the communication range between mmWave transmitter and receiver devices.

Directional communication relies on beamforming mechanisms or schemes, in which the two devices find the relative direction between one another and adjust their antenna transmit/receive patterns such that the RF energy is concentrated in the direction of the strongest path between the devices, normally a line-of-sight (LOS), or straight line, transmission path between the devices.

Those of skill in the art recognize that the term "beamforming" refers to a class of well-known signal processing techniques used in certain antenna arrays for manipulating directional signal transmission or reception. One technique is to combine elements in the particular antenna array in a way that signals at particular angles experience constructive interference, while other signals experience destructive interference. Beamforming, therefore, takes advantage of interference to change the directionality of the array. Beamforming can be used at both the transmitting and receiving ends in order to achieve spatial selectivity. In initially attempting to establish the communication link through the beamforming process, each of a pair of wireless communication devices conventionally transmits a sequence of beamforming training frames to attempt to determine appropriate antenna system settings for both transmission and reception.

The first problem to resolve is to establish some relative direction between the pair of wireless communicating in order to determine the direction in which to exchange the training frames. Conventionally, this problem of finding a relative direction for communication between the devices is solved by a combination of mechanisms known as "sector level sweep" and "beam refinement." The sector level sweep provides a wide area scan in which one device transmits data packets in one direction after another and relies on the feedback received from the an other device to ascertain a direction in which to focus the beam refinement effort. The beam refinement effort then involves further data frame exchanges to refine the antenna settings at either, or both, of the pair of wireless communicating devices as a precursor to data transmission across a mmWave communication link between the devices.

The beamforming protocol, as outlined above, may be a lengthy process, particularly for devices that have a large number of antennas. This process adversely impacts data flow across the mmWave communication link.

Current commercially-available hand-held wireless communicating devices such as, for example, smartphones, tablets, PDAs and the like, are able to access commercially-available wireless networks in the licensed spectrum for cellular telephone communication and other purposes, as well as accessing local wireless access points with integral wireless receivers in the wireless communicating devices for short range communication in the unlicensed Wi-Fi spectrum. A single wireless communicating device is able to employ separate radios to make use of separate and diverse communication paths or links as a multi-radio communicating device combining the benefits of the communication technologies in a seemingly integrated manner to benefit the user of the wireless communicating device. These individual wireless communication devices have capabilities to access these differing network technologies that include communications that are broadcast omnidirectionally.

SUMMARY OF THE DISCLOSED EMBODIMENTS

In view of the above-identified shortfalls and particularly delays inherent in the beamforming schemes for establishing mmWave communication links between cooperating devices, and in view of the existing capacity of wireless communicating devices to communicate with omnidirectional transmitters/receivers, it would be advantageous to provide a system and a method for combining the capabilities of the various communicating technologies to provide a faster and more efficient beamforming scheme.

It would be advantageous to provide a beamforming mechanism that minimizes the time needed to locate a general direction of one device with respect to the other to shorten the amount of time wasted in a wide area search in order to reduce the negative impact on the mmWave communication between the devices, once that communication link is more quickly established. This advantage could be even more significantly exploited as one or both of the cooperating devices become more mobile causing the communicating environment to become more dynamic, i.e. a directional beamforming environment in which frequent re-beamforming may be required based on a changing geometry between the devices through a cooperative coverage area between the devices.

In various example embodiments, the systems and methods according to this disclosure may make advantageous use of location services available from other radios in a multi-radio system to assist the beamforming mechanism, particularly in establishing and maintaining a mmWave communication link between cooperating devices.

In various example embodiments, the systems and methods according to this disclosure may make use of the fact that a majority of wireless communicating devices for use in a mmWave communication link are equipped with multiple radios. Many of the "other" radios include technologies which support location based services, including Global Positioning Satellite system receivers, Wi-Fi transmitters/receivers and cellular transmitters/receivers.

In various exemplary embodiments, the systems and methods according to this disclosure propose a mechanism to use the location services of the "other" radio technologies supported by a wireless client device to assist with the beamforming mechanism for the mmWave communication link, relying on the assumption that the direct LOS path is most likely the strongest one.

In various exemplary embodiments, the systems and methods according to this disclosure may use one or more non-mmWave radios in one device to "learn" about the relative location of the other device with which the mmWave communication link is to be established.

In various exemplary embodiments of the systems and methods according to this disclosure, one device may use GPS or another locating mechanism to autonomously "learn" about its own coordinates. The one device may then rely on other radios to provide its own "learned" coordinates to the other device by, for example, communicating using the non-mmWave radio(s), or even the mmWave radio in a case in which the mmWave communication link is established and functional.

In various exemplary embodiments of the systems and methods according to this disclosure, one device may use location technologies that enable it to locate its own or an other device's coordinates, for example, by using a conventional triangulation mechanism.

In various exemplary embodiments, the systems and methods according to this disclosure may use the relative location information to derive a direction for communication and to compute beamforming parameters such as, for example, a limited set of transmit/receive sectors where a destination device is likely to be reachable. The beamforming parameters may be communicated to a module responsible for beamforming in the mmWave radio. The beamforming may be initiated with the parameters to accommodate the relative direction. It may then be possible to continue with the beamforming mechanism to refine the beam according to conventional methods.

In various exemplary embodiments, the systems and methods according to this disclosure may be used either at the initial connection stage which results in faster connection setup, or during the data flow to assist with re-beamforming, as the triggering mechanism, or otherwise to speed up the re-beamforming process to minimize the impact on the quality of the data flow across the mmWave communication link.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for using location information derived from other radios in a multi-radio device to streamline a mmWave beamforming process will be described, in detail, with reference to the following drawings, in which.

DETAILED DESCRIPTION OF THE DISCLOSED EMBODIMENTS

Figure 1:
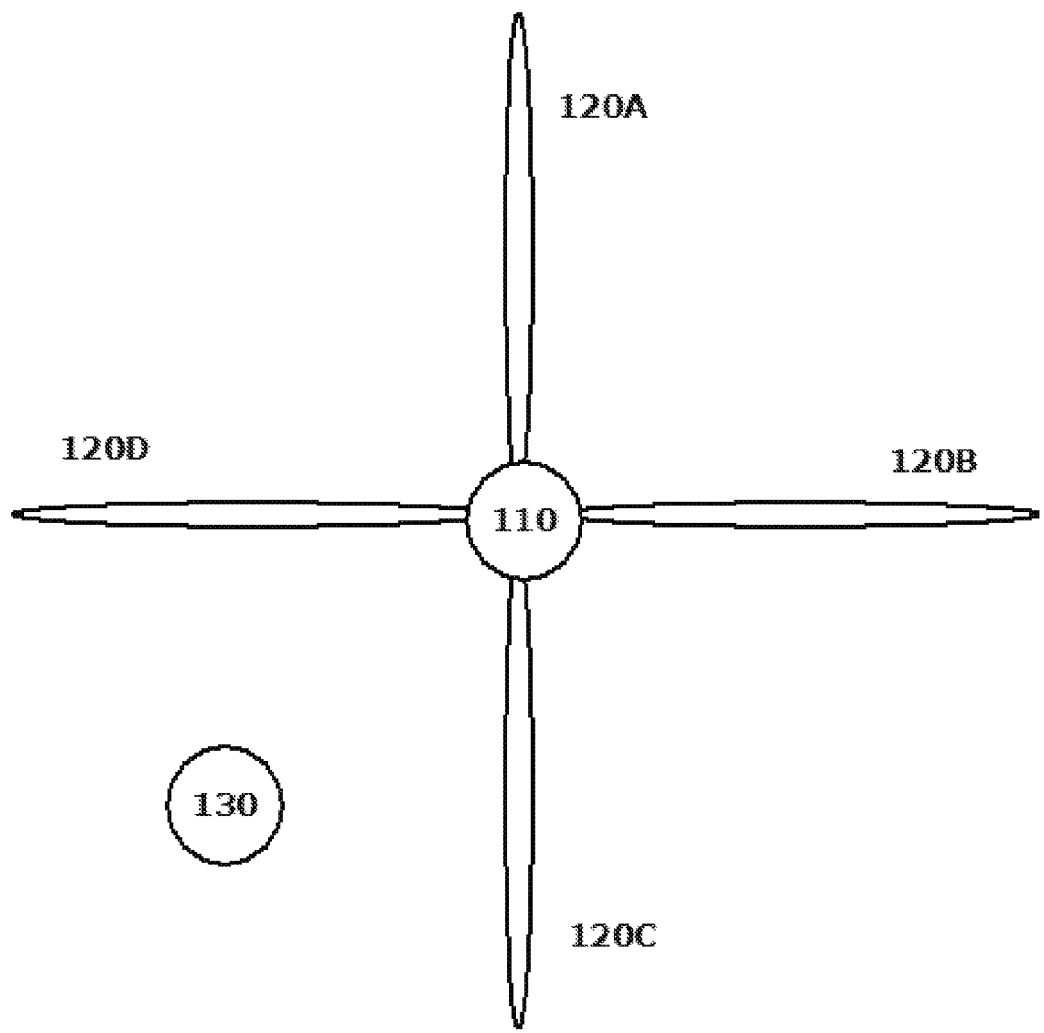
FIG. 1 illustrates an overview of an exemplary system for using location information derived from other radios in a multi-radio device to streamline a mmWave beamforming process according to this disclosure.

The systems and methods for using location information derived from other radios in a multi-radio device to streamline a mmWave beamforming process according to this disclosure will generally refer to this specific utility for those systems and methods. Exemplary embodiments described and depicted in this disclosure should not be interpreted as being specifically limited to any particular combination of communicating capabilities in a single transmitting or receiving device, or to any specific system infrastructure, or as limiting any particular intended use for the described network infrastructure, or transmitting and receiving devices. In fact, any beamforming scheme, and any complementary configuration for transmitting and receiving devices to streamline that beamforming scheme as generally described in this disclosure is contemplated.

Additionally, references throughout this disclosure to a transmitting or receiving device refer to the functionality of those devices at a given time and are not intended to limit any particular device as being only a transmitter or only a receiver. The disclosed systems and methods are applicable to network node devices for communication with dispersed client devices in a network environment, but they are equally applicable to peer-to-peer communications between cooperating multi-radio devices.

Specific reference to for example, any particular handheld or mobile wireless device should be understood as being exemplary only, and not limited, in any manner, to any particular class of wireless communicating devices. The systems and methods according to this disclosure will be described as being particularly adaptable to being hosted on commercially-available hand-held wireless communicating devices such as smartphones, tablets, PDAs and the like, but should not be considered as being limited to only these classes of devices. In fact, the wireless communicating devices as generally described in this disclosure need not be mobile or hand-held.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements, and combinations of those elements, as particularly pointed out in the appended claims. While specific implementations are discussed, it should be understood that this is done for illustration purposes only. A person skilled in the relevant art will recognize that other components and configurations may be used without departing from the spirit and scope of the subject matter of this disclosure.

Various aspects of the disclosed embodiments relate to systems for using location information derived from other radios in a multi-radio device to streamline a mmWave beamforming process and methods for carrying into effect the described streamlining, as well as a corresponding non-transitory computer-readable medium having recorded on it a program that, when executed by a processor, causes the processor to execute the steps of the method for using location information derived from other radios in a multi-radio device to streamline a mmWave beamforming process according to this disclosure.

FIG. 1 illustrates an overview of an exemplary system for using location information derived from other radios in a multi-radio device to streamline a mmWave beamforming process according to this disclosure. As shown in FIG. 1, a first cooperating wireless communicating device 110 may have a capability to project one or more mmWave directional beams 120A-D in various directions. No particular selection of directions for the directional beams 120A-D is intended to be implied by the depiction in FIG. 1.

One or more second cooperating wireless communicating devices, depicted as a single second cooperating wireless communicating device 130 may attempt to establish wireless communication with the first cooperating wireless communicating device 110. For the purposes of this disclosure, it is presumed that the first and second cooperating wireless communicating devices 110,130 includes at least a conventional wireless communication capability via a commercial cellular network and/or a Wi-Fi network, such as, including, for example, a 3 G communication capability. These capabilities may be in one or more individual separate radios in the first and second cooperating wireless communicating devices 110,130. The first and second cooperating wireless communicating devices 110,130 are also presumed to have, for example, a 60 GHz radio, or some other radio by which to provide the first and second cooperating wireless communicating devices 110,130 with a mmWave communication capability. In this manner, it is presumed that the first and second cooperating wireless communicating devices 110,130 may exploit the capabilities of each of the separate communication paths or links in an integrated manner to complement each other. The combination of a 3 G communication capability and a mmWave communication capability should be considered as exemplary only. Other combinations are possible.

In order to effectively employ the ultra-wide bandwidth and the high gain narrow beam formed antennas at the first cooperating wireless communicating device 110, particularly in instances in which the first cooperating wireless communicating device 110 may be, for example, a base station, eNodeB or PBSS Central Point (PCP), the first cooperating wireless communicating device 110 must establish mmWave directional communication with the second cooperating wireless communicating device 130 via a beamforming process. To commence the beamforming process in a streamlined manner, one of the first and second cooperating wireless communicating devices 110,130 may establish communication, or employ established communication, with the other of the first and second cooperating wireless communicating devices 110,130 using one of the non-mmWave omnidirectional radios in each of the first and second cooperating wireless communicating devices 110,130.

With communication established between the first and second cooperating wireless communicating devices 110, 130 using the non-mmWave omnidirectional radios, a position of one of the first and second cooperating wireless communicating devices 110,130 will be ascertained with respect to the other. A position of one, or each, of the devices may be ascertained in any one of a number of conventional methods. For example, one or both of the first and second cooperating wireless communicating devices 110,130 may employ a Global Positioning Satellite (GPS) system receiver to ascertain an own geographic location for the device. With this information obtained by at least one of the first and second cooperating wireless communicating devices 110, 130, the devices may then, via the non-mmWave communication link between the devices, exchange ascertained position(s) of the at least one of the first and second cooperating wireless communicating devices 110,130. Alternatively, either, or both, of the first and second cooperating wireless communicating devices 110,130 may use any conventional method by which to ascertain an own device position and transmit that own device position to the other device via the non-mmWave communication link. Another method by which a position of one of the first and second cooperating wireless communicating devices 110,130 may be ascertained, for example, may be through the use of, for example, a triangulation method using, for example, received signal strength indications ("RSSI") from the device obtained via a number of wireless access points (not shown) with which the device is in communication.

One or both of the first and second cooperating wireless communicating devices 110,130 having ascertained an own device, or an other device position, may approximate a relative position between the devices and execute a beamforming mechanism in which a limited sector sweep may be undertaken according to conventional methods based on the approximated relative position between the devices, or the sector sweep portion of the beamforming mechanism may be bypassed altogether depending on the granularity of the approximated relative position between the devices and beamforming refinement may be commenced.

According to the above scenario, the beamforming process can be significantly streamlined based on an ability of the first and second cooperating wireless communicating devices 110,130 to ascertain at least an approximate relative position between the devices in order to focus the beamforming effort for establishing the mmWave communication link between the first and second cooperating wireless communicating devices 110,130 in at least a specific sector, if not directly at a refined position of one of the devices with respect to the other.

Once the mmWave, e.g. 60 GHz, communication link is established, additional monitoring may be undertaken between the first and second cooperating wireless communicating devices 110,130 that may include monitoring characteristics of a strength of the mmWave communication link.

The characteristics may include, for example, Packet Error Rate (PER) or other like characteristic to determine whether, particularly with movement of one of the first and second cooperating wireless communicating devices 110,130, the mmWave communication link, and particularly a directional of the directional beam should be updated based on an updated relative position between the first and second cooperating wireless communicating devices 110,130. If it is determined that the mmWave communication link is deteriorating for any reason, an updated relative position between the first and second cooperating wireless communicating devices 110,130 may be ascertained according to any of the above-described localization methods and modification of the directional beam may be undertaken in a re-beamforming process. The difference here is that communication of the updated relative position between the first and second cooperating wireless communicating devices 110,130 may be transmitted via a mmWave communication link before it completely deteriorates, in addition to being transmitted across the non-mmWave communication links.

Figure 2:
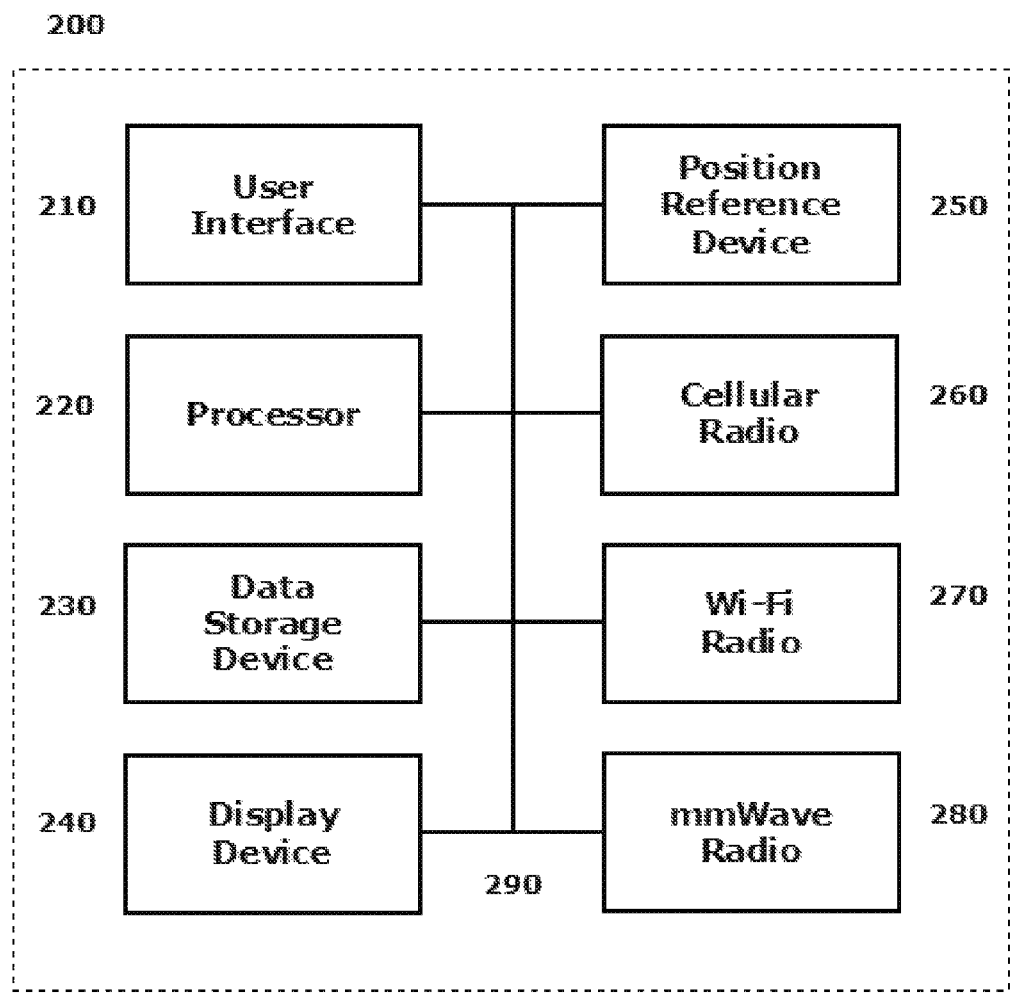
FIG. 2 illustrates a block diagram of an exemplary wireless communicating device that integrates multiple radios for using location information derived from other radios in the multi-radio wireless communicating device to streamline a mmWave beamforming process according to this disclosure.

FIG. 2 illustrates a block diagram of an exemplary wireless communicating device 200 that integrates multiple radios for using location information derived from other radios in the multi-radio wireless communicating device to streamline a mmWave beamforming process according to this disclosure. The wireless communicating device 200 may be, for example, a smartphone, tablet, PDA or other like mobile communicating device. The wireless communicating device 200 may otherwise be a substantially fixed wireless communication unit.

The wireless communicating device 200 may include a user interface 210 by which the user can communicate with the wireless communicating device 200, and may otherwise communicate information via the wireless communicating device 200 to a cooperating wireless communicating device (see FIG. 1) with which the wireless communicating device 200 is in wireless communication. The user interface 210 may be configured as one or more conventional mechanisms that permit a user to input information to the wireless communicating device 200. The user interface 210 may include, for example, an integral keyboard, or a touchscreen with "soft" buttons for communicating commands and information to the wireless communicating device 200. The user interface 210 may alternatively include a microphone by which a user may provide oral commands to the wireless communicating device 200 to be "translated" by a voice recognition program or otherwise. The user interface 210 may otherwise include any other like device for user operation of, and data exchange with, the wireless communicating device 200, such as, for example, a separate keyboard and mouse, or a portable data storage medium and compatible data storage medium reader, that a user may employ to input data and/or instructions to the wireless communicating device 200. A user may make inputs via the user interface 210 to provide information to the cooperating wireless communicating device regarding particularly a position of the wireless communicating device 200, or to respond to inquiries from the cooperating wireless communicating device while attempting, for example, to establish communication with the cooperating wireless communicating device via one or more of the communication links that are supported by one of the multiple radios in the wireless communicating device 200. Information sent to the cooperating wireless communicating device may include requests for data delivery to the wireless communicating device 200.

The wireless communicating device 200 may include one or more local processors 220 for individually undertaking the processing and control functions that are carried out by the wireless communicating device 200. Processor(s) 220 may include at least one conventional processor or microprocessor that interprets and executes instructions and processes outgoing and incoming data via the different communication links supported by the multiple radios in the wireless communicating device 200. Particularly germane to this disclosure is the ability of the processor(s) 220 to process incoming data from multiple receivers in the wireless communicating device 200 to attempt to maintain an awareness of a geographic location of the wireless communicating device 200 based on information obtainable from those multiple receivers.

The wireless communicating device 200 may include one or more data storage devices 230. Such data storage device(s) 230 may be used to store data, and operating programs or applications to be used by the wireless communicating device 200, and specifically the processor(s) 220. Again here, particularly germane are applications for discerning, storing and randomly or continuously updating a geographic position of the wireless communicating device 200. Data storage device(s) 230 may include a random access memory (RAM) or another type of dynamic storage device that stores location and other information and instructions for execution by the processor(s) 220. Data storage device(s) 230 may also include a read-only memory (ROM), which may include a conventional ROM device or another type of static storage device that stores static information and instructions for execution by the processor(s) 220. The data storage device(s) 230 will generally be those that are integral to the wireless communicating device 200, but may also include such devices that are external to, and in wired or wireless communication with, the wireless communicating device 200. At least one data storage device 230 may be specifically configured to store instructions to execute a beamforming process for establishing and maintaining a mmWave communication link between the wireless communicating device 200 and a cooperating wireless communicating device.

The wireless communicating device 200 may include at least one data display device 240 that may be configured as one or more conventional mechanisms that display information to the user of the wireless communicating device 200 for operation of the wireless communicating device 200 in its various operating modes, or otherwise for displaying, for example, data received via any of the communication links with which the multiple radios of the wireless communicating device 200 support interaction.

The wireless communicating device 200 may include one or more position reference devices 250. Such position reference devices 250 may comprise, for example, a Global Positioning Satellite (GPS) system receiver for receiving GPS location information by the wireless communicating device 200, and/or may include an inertial navigation unit or other like device that can localize a position of the wireless communicating device 200 for use. Separately, the wireless communicating device 200 may execute a triangulation algorithm that uses, for example, an RSSI value for each of a number of wireless access points within a vicinity of the wireless communicating device 200 to ascertain its current location. The wireless communicating device 200 may be able to provide, upon request, location information for a current location of the wireless communicating device 200 to a cooperating wireless communicating device in order to, for example, streamline a sector sweep portion of a beamforming process executed by the wireless communicating device 200 and/or the cooperating wireless communicating device based on the location information of the wireless communicating device 200.

The position reference device 250 may also include additional position determination functions by which the wireless communicating device 200 may collect, from one or more cooperating wireless communicating devices, information regarding a current location of the one or more cooperating wireless communicating devices. In this regard, the position reference device 250 may operate in conjunction with the processor(s) 220 to streamline a beamforming or re-beamforming scheme undertaken by the processor(s) 220 to establish and maintain a mmWave communication link over a directional beam between the wireless communicating device 200 and the one of more cooperating wireless communicating devices. The position reference device 250 may employ position information collected by one or more of the cooperating wireless communicating devices and transmitted to the wireless communicating device 200 via one or more of the communication links that the wireless communicating device 200 is able to establish with the one or more cooperating wireless communicating devices based on the composition of the multiple radios in the one or more cooperating wireless communicating devices. Otherwise, the position reference device 250 may, on its own, ascertained a position of one or more cooperating wireless communicating devices by employing, for example, triangulation methods which triangulate a position of the one or more cooperating wireless communicating devices with respect to, for example, one or more wireless access points in the vicinity of the one or more cooperating wireless communicating devices based on characteristics of signals received from the one or more cooperating wireless communicating devices by the wireless access points including, for example, RSSI. Any method by which the position reference device 250 in the wireless communicating device 200 may be able to ascertain a position of one or more cooperating wireless communicating devices with which the wireless communicating device 200 communicates will aid in streamlining the beamforming process carried out by the processor(s) 220 in the wireless communicating device 200.

The wireless communicating device 200 may combine different individual radio devices within a single integrated package. As shown in FIG. 2, the different individual radio devices may include a cellular radio 260, a Wi-Fi radio 270 and a mmWave radio 280, each of which represents an external data communication interface for specific communication with different communication links available within a vicinity of the wireless communicating device 200. The depiction in FIG. 2 represents only one combination of potential multi-radio configurations that may be housed in, and employed by, the wireless communicating device 200. Other combinations of individual radios in a wireless communicating device 200 are contemplated.

All of the various components of the wireless communicating device 200, as depicted in FIG. 2, may be connected by one or more data/control busses 290. The data/control bus(ses) 290 may provide internal wired or wireless communication between the various components of the wireless communicating device 200, as all of those components are housed integrally in the wireless communicating device 200.

It should be appreciated that, although depicted in FIG. 2 as an integral unit, the various disclosed elements of the wireless communicating device 200 may be arranged in any combination of sub-systems as individual components or combinations of components, housed in a single location or remotely dispersed in multiple locations, and in wired or wireless communication with, other of the individual components of the wireless communicating device 200. In other words, no specific configuration as an integral unit or as a support unit, or as several units or sub-systems widely dispersed, for the wireless communicating device 200 is to be implied by the depiction in FIG. 2.

The disclosed embodiments include a method that uses location information derived from other radios in a multi-radio device to streamline a mmWave beamforming process. The method may be initiated by a one wireless communicating device establishing communication with a an other cooperating wireless communicating device via one or more wireless communication links. The method may make a determination regarding whether the wireless communication between the cooperating wireless communicating devices is most appropriately supported by a mmWave communication link such as, for example, a 60 GHz mmWave communication link. If a determination is made that the requested communication is most appropriately supported by a mmWave communication link, one and/or the other of the cooperating wireless communicating devices may employ available non-mmWave communication links to ascertain a relative positioning between the cooperating wireless communicating devices. The relative positioning between the cooperating wireless communicating devices may be ascertained by any available means in order to streamline a beamforming process for establishing and/or maintaining the a mmWave communication link between the cooperating wireless communicating devices. With the relative positioning between the cooperating wireless communicating devices ascertained, this information is then used to direct a beamforming process in a direction based on the ascertained relative positioning. The method may then establish a mmWave communication link between the cooperating wireless communicating devices when the beamforming has progressed far enough to support the mmWave communication link. The method may then monitor transmission and reception characteristics of the established mmWave communication link to determine the fidelity of the communication link based on those characteristics. The characteristics may include, for example, Packet Error Rate, or other like parameter, to determine when the fidelity of the communication link has deteriorated and whether an updated relative position between the cooperating wireless communicating devices, for example, should be ascertained to trigger re-beamforming. The method may continue these steps in an iterative manner until the mmWave communication link is ultimately broken.

Figure 3:
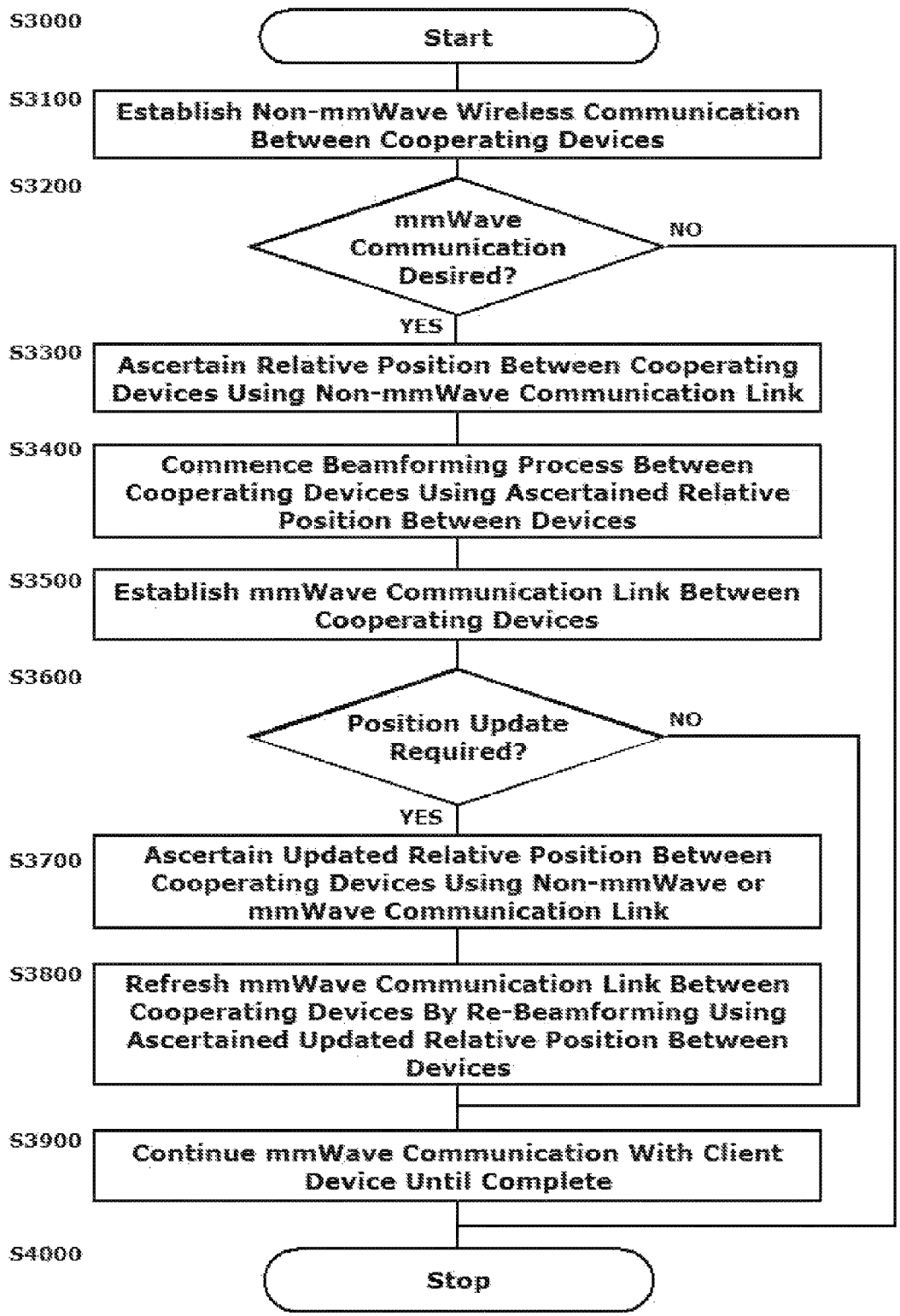
FIG. 3 illustrates a flowchart of an exemplary method that uses location information derived from other radios in a multi-radio device to streamline a mmWave beamforming process according to this disclosure.

FIG. 3 illustrates a flowchart of an exemplary method that uses location information derived from other radios in a multi-radio device to streamline a mmWave beamforming process according to this disclosure. As shown in FIG. 3, operation of the method commences at Step S3000 and proceeds to Step S3100.

In Step S3100, a first wireless communicating device may initiate a request to communicate with, or to communicate particular data with, a second wireless communicating device via one or more non-mmWave communication links. A presumption at this point in the method is that a mmWave communication link is not established between the first and second wireless communicating devices. It should be understood that non-mmWave communication may have previously been established between the first and second wireless communicating devices. Operation of the method proceeds to Step S3200.

Step S3200 is a determination step. In Step S3200, a determination is made whether it may be appropriate to establish a mmWave communication link between the first and second wireless communicating devices. This determination may be based on any one of a number of factors. Among those factors are that each of the first and second wireless communicating devices are capable of establishing and maintaining a mmWave communication link between them based on the radios that each of the first and second wireless communicating devices includes. Another factor may be the type of data request received from one of the first and second wireless communicating devices by the other of the first and second wireless communicating devices. For example, movie downloads, high-quality HD, 3D stereo streaming, and other data downloads that are of large volume or would benefit from mmWave transmission between the first and second wireless communicating devices, may be considered appropriate candidates for transmission across a mmWave communication link.

If, in Step S3200, it is determined that it is not appropriate to establish a mmWave communication link between the first and second wireless communicating devices, operation of the method proceeds to Step S4000 where operation of the method ceases.

If, in Step S3200, it is determined that it is appropriate to establish a mmWave communication link between the first and second wireless communicating devices, operation of the method proceeds to Step S3300.

In Step S3300, a relative position of one of the first and second wireless communicating devices with respect to the other of the first and second wireless communicating devices may be ascertained by any available means. In this context, any determination of a relative position between the first and second wireless communicating device, according to the methods described above, or otherwise, is contemplated. The relative position between the first and second wireless communicating devices will aid in streamlining the beamforming process to establish the mmWave communication link between the first and second wireless communicating devices. Available means by which to determine a relative position between the first and second wireless communicating devices may include, for example, obtaining from one or the other of the first and second wireless communicating devices a current geographic position as resolved by reference to a Global Positioning Satellite (GPS) system with the GPS receiver in the one or the other of the first and second wireless communicating devices, or otherwise by reference to other devices such as, for example, an inertial measurement unit, or single-strength triangulation with local wireless access points with which the one or the other of the first and second wireless communicating devices is in wireless communication. These example methods by which to detect a relative position between the first and second wireless communicating devices are described for illustration purposes only and are intended to be in no way limiting. All cross talk between cooperating first and second wireless communicating devices involved in a relative position resolution, it should be recognized, may be undertaken using one or more of the other, i.e., non-mmWave, radios in both of the first and second wireless communicating devices by which these devices can establish communications via other communications links. It is this ability to communicate via other radios in a multi-radio system that provides at least an initial streamlining capability for the beamforming process according to this method. Once a mmWave communication link is established, the mmWave radio in each of the first and second wireless communicating devices may also aid in data exchange regarding relative positioning. Operation of the method proceeds to Step S3400.

In Step S3400, having obtained a relative position between the first and second wireless communicating devices, either or both of the first and second wireless communicating devices may commence a streamlined beamforming process. At a minimum, a complete sector sweep is not required as a relative positioning between the first and second wireless communicating devices will point the beamforming effort in a specific sector. Depending on a fidelity to which a relative position between the first and second wireless communicating devices is resolved, the sector sweep portion of the beamforming mechanism may be bypassed completely. In such an instance, the beamforming process may proceed directly to beamforming refinement. In any case, an ability of the method to discern a relative positioning between the first and second wireless communicating devices will reduce the computing overhead required for the beamforming process and will reduce the time required to resolve a usable transmission/reception beam for mmWave communication between the first and second wireless communicating devices. Operation of the method proceeds to Step S3500.

In Step S3500, with the beamforming process complete, or nearly complete, mmWave communications may be established between the first and second wireless communicating devices. While these communications are ongoing, one or more of the available communication links in the multi-radio system may be used to monitor the fidelity of the mmWave communication link. This may prove particularly appropriate in a dynamic operating environment in which one or both of the first and second wireless communicating devices is mobile in a cooperating coverage area between the first and second wireless communicating devices. Operating characteristics of the mmWave communication link such as, for example, Packet Error Rate (PER) or other like characteristic may be monitored to determine whether an opportunity for re-beamforming should be undertaken between the first and second wireless communicating devices in order to improve the fidelity of the mmWave communication link. Operation the method proceeds to Step S3600.

Step S3600 is a determination step. In Step S3800, a determination is made based on the monitored characteristics of the mmWave communication link whether an updated relative position between the first and second wireless communicating devices should be ascertained to facilitate re-beamforming.

If, in Step S3600, it is determined that an updated relative position between the first and second wireless communicating devices need not be ascertained, operation the method proceeds to Step S3900.

If, in Step S3600, it is determined that an updated relative position between the first and second wireless communicating devices should be ascertained, operation the method proceeds to Step S3700.

In Step S3700, an updated relative position between the first and second wireless communicating devices is ascertained by any of the above-discussed methods. Operation of the method proceeds to Step S3800.

In Step S3800, having obtained an updated relative position between the first and second wireless communicating devices, either or both of the first and second wireless communicating devices may commence a streamlined re-beamforming process in the manner described above. Operation of the method proceeds to Step S3900.

In Step S3900, across an established or otherwise re-established mmWave communication link, mmWave data communication continues until there is no longer a need for the mmWave communication link. Operation of the method proceeds to Step S4000 where operation of the method ceases.

The disclosed embodiments may include a non-transitory computer-readable medium storing instructions which, when executed by a processor, may cause the processor to execute the steps of a method as outlined, and as described in detail, above.

The above-described exemplary systems and methods reference certain conventional components to provide a brief, general description of a suitable communication and processing environment in which the subject matter of this disclosure may be implemented for familiarity and ease of understanding. Although not required, embodiments of the disclosure may be provided, at least in part, in a form of hardware circuits, firmware or software computer-executable instructions to carry out the specific functions described, such as program modules, being executed by a processor. Generally, program modules include routine programs, objects, components, data structures, and the like that perform particular tasks or implement particular data types.

Those skilled in the art will appreciate that other embodiments of the disclosed subject matter may be practiced in communication network environments with many types of multi-radio communication equipment and computing system configurations, particularly in hand-held or otherwise portable wireless communicating devices, multi-processor systems, microprocessor-based or programmable consumer electronics, and the like.

Embodiments may also be practiced in distributed network communication environments where tasks are performed by local and remote processing devices, generally including fixed and mobile wireless communicating devices as outlined above, that are linked to each other by hardwired links, wireless links, or a combination of both through a communication network. In a distributed network environment, program modules may be located in both local and remote data storage devices.

Embodiments within the scope of the present disclosure may also include computer-readable media having stored computer-executable instructions or data structures that can be accessed, read and executed by the wireless communicating devices using a compatible data reader. Such computer-readable media may be any available media that can be accessed by a processor in, or in communication with, the disclosed wireless communication devices. By way of example, and not limitation, such computer-readable media can comprise RAM, ROM, EEPROM, CD-ROM, DVD-ROM, flash drives, thumb drives, data memory cards or other analog or digital data storage devices that can be used to carry or store desired program elements or steps in the form of accessible computer-executable instructions or data structures. When information is transferred or provided over a network or another communication connection the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause network components, any wireless communicating device, or a processor in such a wireless communicating device, to perform certain of the above-specified functions, individually, or in combination. Computer-executable instructions also include program modules that are remotely stored for access by the wireless communicating devices to be executed by processors in the wireless communicating devices when those devices are caused to communicate in network environments across any communication link such as those depicted and described in exemplary manner above.

The exemplary depicted sequence of executable instructions, or associated data structures for executing those instructions, represents one example of a corresponding sequence of acts for implementing the functions described in the steps. The steps of the method, as depicted, are not intended to imply any particular order to the depicted steps except as may be necessarily inferred when one of the depicted steps is a necessary precedential condition to accomplishing another of the depicted steps.

Although the above description may contain specific details, they should not be construed as limiting the claims in any way. Other configurations of the described embodiments of the disclosed systems and methods are part of the scope of this disclosure. For example, the principles of the disclosure may be applied to each individual wireless communicating device operating in a particular network coverage area where each wireless communicating device may individually and independently operate within the depicted and described system. This enables each user to use the benefits of the disclosure even if any one of a large number of possible applications does not need a specific aspect of the functionality described and depicted in this disclosure. In other words, there may be multiple instances of the components each processing the content in various possible ways. It does not necessarily need to be one system used by all end users. Accordingly, the appended claims and their legal equivalents should only define the disclosure, rather than any specific examples given.

We claim:

1. A method for streamlining a beamforming process between wireless communicating devices, comprising:

obtaining a relative position between a first wireless communicating device and a second wireless communicating device using an omnidirectional wireless communication link;

commencing a beamforming process for a directional wireless communication link, with a processor in at least one of the first and second wireless communicating devices, based on the obtained relative position between the first and second wireless communicating devices; and wherein the beamforming process comprising conducting a sector sweep in a limited set of one or more sectors, the limited set being less than all of the sectors and defined based on the obtained relative position between the first and second wireless communicating devices;

wherein the beamforming process bypassing a sector sweep and conducting only refined beamforming when the processor determines that the obtained relative position between the first and second wireless communicating devices supports such an approach;

wherein the directional wireless communication link is a 60 GHz communication link;

transmitting data across the directional wireless communication link when the processor substantially completes the beamforming process.

2. The method of claim 1, the obtaining of the relative position between the first and second wireless communicating devices comprising one or both of the first and second wireless communicating devices resolving a geographic position of the at least one of the first and second wireless communicating devices with reference to a Global Positioning Satellite (GPS) system via a GPS receiver in one of the first and second wireless communicating devices.

3. The method of claim 1, the omnidirectional wireless communication link being a cellular communication link or a Wi-Fi communication link, and
the directional wireless communication link being a millimeter wave (mmWave) communication link.

4. The method of claim 3, the obtaining of the relative position between the first and second wireless communicating devices comprising one of the first and second wireless communicating devices resolving a geographic position of at least one of the first and second wireless communicating devices by employing a triangulation algorithm that makes use of characteristics of one of the cellular communication link and the Wi-Fi communication link.

5. The method of claim 1, further comprising:
monitoring, with the processor, at least one communication link quality parameter while transmitting the data across the directional wireless communication link;
determining, based on the at least one communication link quality parameter, that re-beamforming should be performed;
obtaining an updated relative position between the first and second wireless communicating devices; and
performing re-beamforming with the processor using the updated relative position between the first and second wireless communicating devices.

6. The method of claim 1, further comprising storing information on the obtained relative position between the first and second wireless communicating devices for use by the processor in a data storage device in at least one of the first and second wireless communicating devices.

7. A system for streamlining a beamforming process between wireless communicating devices, comprising:
a first wireless communicating device, and a second wireless communicating device in wireless communication with the first wireless communicating device, each of the first and second wireless communicating devices comprising:
a radio that receives position information;
a radio that conducts omnidirectional wireless communication;
a radio that conducts directional wireless communication separate from the radio that conducts omnidirectional wireless communication; and
a processor programmed (1) to execute a beamforming scheme for establishing a directional communication link between the first and second wireless communicating devices for the directional wireless communication, (2) to obtain a relative position between the first and second wireless communicating devices, and (3) to execute the beamforming scheme including the obtained relative position as a starting point for the beamforming scheme, wherein the directional wireless communication link is a 60 GHz communication link;
wherein respective radios that conduct directional wireless communication separate from the radios that conduct omnidirectional wireless communication in the first and second wireless communicating devices being millimeter wave (mmWave) radios for establishing a mmWave communication link between the first and the second wireless communicating devices;
wherein the processor in at least one of the first and second wireless communicating devices being further programmed to execute the beamforming scheme by conducting a sector sweep initially in a limited set of one or more sectors, the limited set being less than all of the sectors and defined based on the obtained relative position between the first and second wireless communicating devices.

8. The system of claim 7, the radio that receives position information and the radio that conducts omnidirectional wireless communication in at least one of the first and second wireless communicating device being a same radio.

9. The system of claim 7, wherein the respective radios that conduct omnidirectional wireless communication in the first and second wireless communicating devices being cellular radios or Wi-Fi radios.

10. The system of claim 7, the processor in at least one of the first and second wireless communicating devices being further programmed to determine that the obtained relative position between the first and second wireless communicating devices is of such a quality that the beamforming scheme conducts only refined beamforming.

11. The system of claim 7, all communication between the first and second wireless communicating devices regarding obtaining the relative position between the first and second wireless communicating devices being conducted between respective radios that conduct omnidirectional wireless communication in the first and second wireless communicating devices.

12. The system of claim 7, the radio that receives position information in at least one of the first and second wireless communicating devices being a Global Positioning Satellite (GPS) radio and the obtained relative position between the first and second wireless communicating devices being based on a GPS position of the at least one of the first and second wireless communicating devices.

13. The system of claim 7, the radio that receives position information in at least one of the first and second wireless communicating devices being a cellular radio or a Wi-Fi radio, and the obtained relative position between the first and second wireless communicating devices being based on a processor in at least one of the first and second wireless communicating devices resolving a geographic position of one of the first and second wireless communicating devices by employing a triangulation algorithm that makes use of characteristics of one of a cellular communication link and a Wi-Fi communication link in which the first and second wireless communicating devices participate.

14. The system of claim 7, the processor in at least one of the first and second wireless communicating devices being further programmed to
monitor at least one communication link quality parameter of the directional communication link between the first and second wireless communicating devices while transmitting data between the first and second wireless communicating devices across the directional communication link, and
determine, based on the at least one communication link quality parameter, that re-beamforming should be performed.

15. The system of claim 14, the processor in at least one of the first and second wireless communicating devices being further programmed to
obtain an updated relative position between the first and second wireless communicating devices; and
perform re-beamforming using the updated relative position between the first and second wireless communicating devices.

16. A non-transitory computer-readable medium storing computer-readable instructions beamforming process between wireless communicating devices, comprising:

obtaining a relative position between a first wireless communicating device and a second wireless communicating device using an omnidirectional wireless communication link;

commencing a beamforming process for a directional wireless communication link, with a processor in at least one of the first and second wireless communicating devices, based on the obtained relative position between the first and second wireless communicating devices; and wherein the beamforming process comprising conducting a sector sweep in a limited set of one or more sectors, the limited set being less than all of the sectors and defined based on the obtained relative position between the first and second wireless communicating devices;

wherein the beamforming process bypassing a sector sweep and conducting only refined beamforming when the processor determines that the obtained relative position between the first and second wireless communicating devices supports such an approach;

wherein the directional wireless communication link is a 60 GHz communication link;

transmitting data across the directional wireless communication link when the processor substantially completes the beamforming process.

* * * * *